United States Patent [19]

Terunuma

[11] Patent Number: 5,978,184
[45] Date of Patent: Nov. 2, 1999

[54] MAGNETORESISTIVE EFFECT ELEMENT AND THIN FILM MAGNETIC HEAD WITH THE ELEMENT

[75] Inventor: Koichi Terunuma, Tokyo, Japan

[73] Assignee: TDK Corporation, Kanagawa, Japan

[21] Appl. No.: 09/084,355

[22] Filed: May 27, 1998

[30] Foreign Application Priority Data

May 29, 1997 [JP] Japan .................................. 9-154362

[51] Int. Cl.$^6$ ....................................................... G11B 5/39
[52] U.S. Cl. ............................................................. 360/113
[58] Field of Search ............................. 360/113; 324/252; 338/32 R

[56] References Cited

U.S. PATENT DOCUMENTS 5,754,376  5/1998  Kobayashi et al. ...................... 360/113
5,784,225  7/1998  Saito et al. .............................. 360/113
5,852,533  12/1998  Miyauchi et al. ....................... 360/113

*Primary Examiner*—John H. Wolff
*Attorney, Agent, or Firm*—Nikaido Marmelstein Murray & Oram LLP

[57] ABSTRACT

A MR element includes a MR layer with a strip shape extending in a track width direction. The MR layer has a surface located at a front end edge of the layer, to be opposed to a magnetic medium, and a tapered portion located at a rear end edge of the layer. In order to define the height of the MR layer, a length of the tapered portion along a direction perpendicular to the track width direction (L) is determined to substantially ⅕ or less, preferably ⅒ or less of a distance between the front end edge and the rear end edge of the MR layer ($h_{MR}$).

4 Claims, 2 Drawing Sheets

MAGNETORESISTIVE EFFECT ELEMENT AND THIN FILM MAGNETIC HEAD WITH THE ELEMENT

FIELD OF THE INVENTION

The present invention relates to a magnetoresistive effect (MR) element for reproducing information recorded on a magnetic medium such as a magnetic disk, and to a thin film magnetic head provided with the MR element.

DESCRIPTION OF THE RELATED ART

A MR layer in a thin film magnetic head with a MR element (hereinafter such head is called as MR head) is in general formed by depositing a ferromagnetic material layer such as a NiFe layer on a lower shield layer, and by executing ion milling of the ferromagnetic layer through a patterned resist mask.

In case that the MR layer is patterned by the ion milling method, its rear end edge (end edge at opposite side of ABS (Air Bearing Surface)) will not be terminated in a right angled surface but will be terminated in an oblique surface or a tapered surface. If the length L in a direction perpendicular to the track width direction of the tapered portion becomes longer, it is extremely difficult to precisely define the rear end edge of the MR layer. Thus, the height $h_{MR}$ of the MR layer (length across the ABS edge and the rear end edge of the MR layer, hereinafter called as MR height) cannot be precisely defined. Even if the MR height $h_{MR}$ can be defined, in case that the length L of the tapered portion becomes large in comparison with the MR height $h_{MR}$, reproduced output power from the MR head will be lowered, an electrical resistance of the MR element will increase, and also precision of estimated life of the MR element reflecting its electro-migration will be deteriorated.

In addition, since it is necessary to keep the aspect ratio of the rectangular plane shape of the MR layer at constant, the narrower of the track width of the MR head due to demand for higher recording density, the smaller of the MR height. Thus, increase in the length L of the tapered portion of the MR layer will induce large problem.

SUMMARY OF THE INVENTION

It is therefore an object of the present invention to provide a MR element and a thin film magnetic head with a MR layer, whereby a length of a tapered portion of the MR layer located at its rear end edge can be properly defined.

According to the present invention, the MR element of the thin film magnetic head includes a MR layer with a strip shape extending in a track width direction. The MR layer has a surface located at a front end edge of the layer, to be opposed to a magnetic medium, and a tapered portion located at a rear end edge of the layer. Particularly, according to the invention, a length of the tapered portion along a direction perpendicular to the track width direction (L) is determined to substantially ⅕ or less, preferably ¹⁄₁₀ or less of a distance between the front end edge and the rear end edge of the MR layer ($h_{MR}$). The MR element of the invention may be a AMR element (anisotropic magnetoresistive effect element) or a GMR element (giant magnetoresistive effect element) such as a spin-valve MR element.

Ion milling conditions are determined so that the tapered portion length L is about ⅕ or less of the MR height $h_{MR}$, preferably about ¹⁄₁₀ or less of $h_{MR}$. As a result, the reproduced output power from the MR head can be prevented from being lowered, and also precision of estimated life of the MR element can be prevented from deteriorating.

Further objects and advantages of the present invention will be apparent from the following description of the preferred embodiments of the invention as illustrated in the accompanying drawings.

DESCRIPTION OF THE PREFERRED EMBODIMENTS

Figure 1:
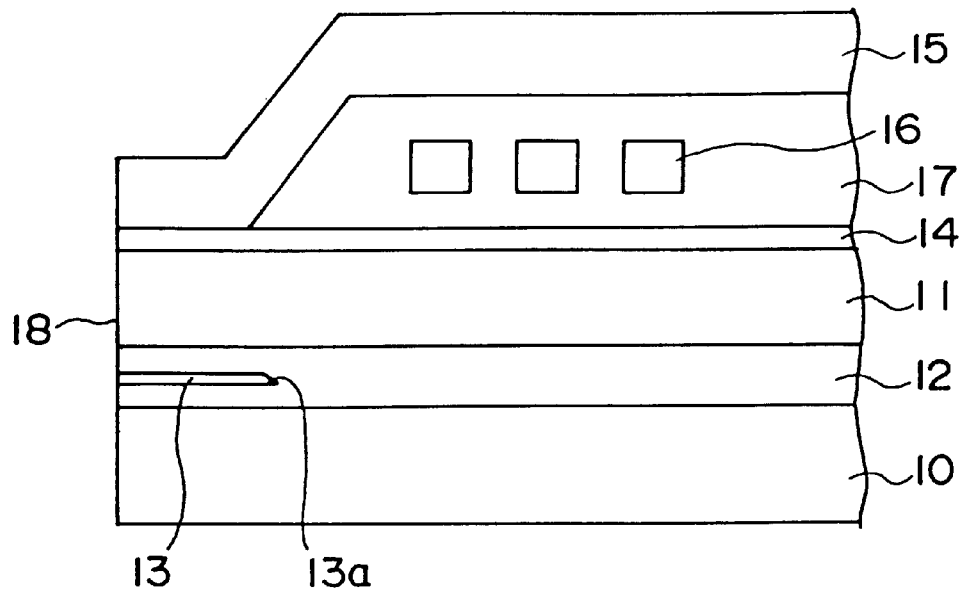
FIG. 1 shows a sectional view schematically illustrating a multi-layered structure of a MR head in a preferred embodiment according to the present invention.

FIG. 1 schematically illustrates a multi-layered structure of a composite type thin film magnetic head with an inductive recording head part and a MR reproducing head part in a preferred embodiment according to the present invention.

In the figure, reference numeral 10 denotes a lower shield layer, 11 denotes an upper shield layer which also operates as a lower magnetic pole layer of the recording head part, 12 denotes a shield gap layer sandwiched between the lower and upper shield layers 10 and 11, 13 denotes a MR layer formed in the shield gap layer 12, 14 denotes a recording gap layer, 15 denotes an upper magnetic pole layer, 16 denotes a coil formed in an insulating layer 17, and 18 denotes an ABS to be opposed to a magnetic medium, respectively.

The MR layer 13 is formed by a ferromagnetic material layer such as NiFe or NiFeCo (in case of AMR head, anisotropic magnetoresistive effect head) or by a spin-valve multi-layered structure (in case of GMR head, giant magnetoresistive effect head), in a strip shape extending in the track width direction.

Figure 2:
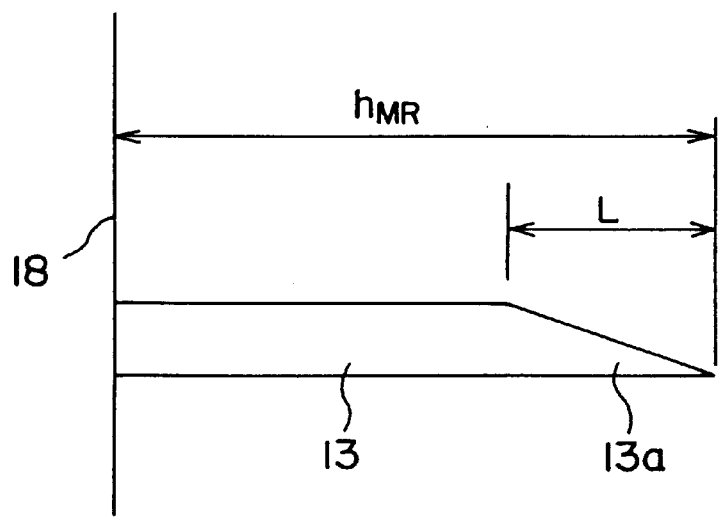
FIG. 2 shows an enlarged sectional view of the MR layer shown in FIG. 1.

FIG. 2 indicates an enlarged sectional view of this MR layer 13 portion only. As will be noted from FIG. 2, a tapered portion 13a will be formed at the rear end edge of the MR layer 13 (end edge at the opposite side of the ABS 18) due to ion milling for patterning the MR layer 13.

Considerable studies of the inventors in this application have shown that the length L of the tapered portion 13a, in a direction of the MR height $h_{MR}$, can be controlled depending upon conditions of ion milling such as incident angle of the ion beam and thickness of the resist mask for the ion milling. With respect to a plurality of MR heads which are manufactured under various ion milling conditions, the MR element resistances are measured and the MR height $h_{MR}$ and the tapered portion length L are also measured by a SEM (Scanning Electron Microscope).

Figure 3:
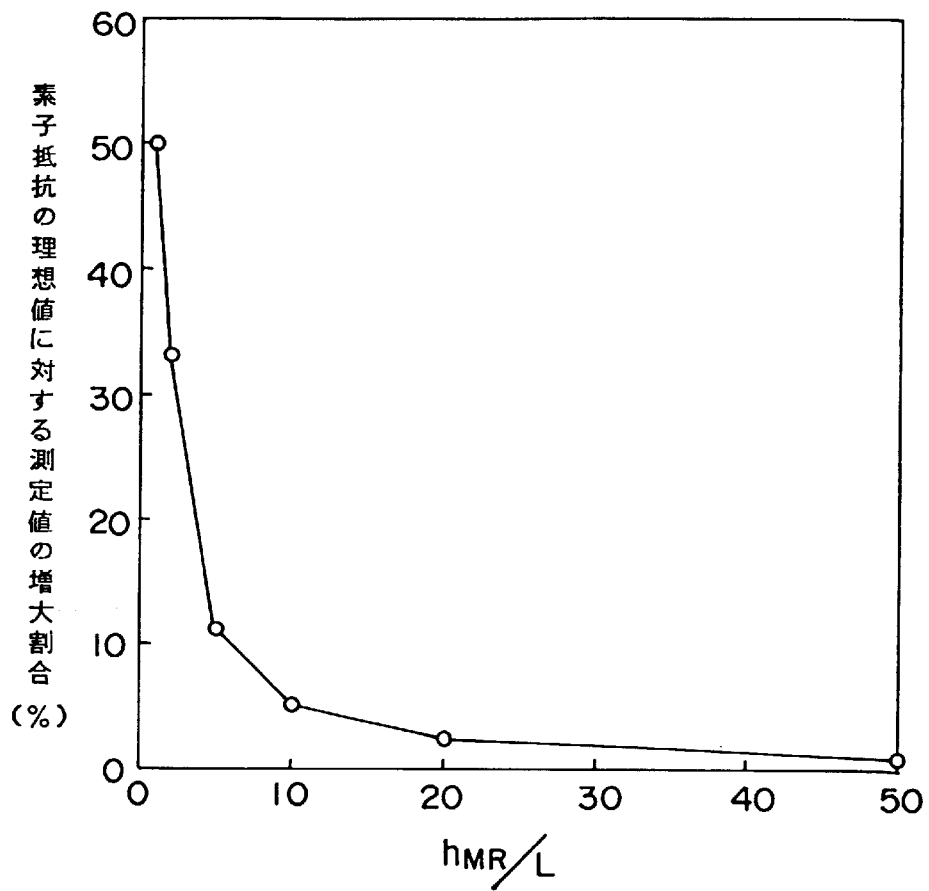
FIG. 3 shows a graph illustrating a relationship between $h_{MR}/L$ and increased ratio of measured MR element resistance of with respect to a calculated MR element resistance of the MR layer with an ideal shape.

FIG. 3 represents the measured result. In the figure, the horizontal axis indicates $h_{MR}$, and the vertical axis indicates an increased ratio of a measured element resistance (measured value) with respect to a calculated element resistance (calculated value in an ideal shape) which is calculated as the MR layer has an ideal shape with no tapered portion 13a (L=0). Namely, the vertical axis indicates (measured value −calculated value)/(calculated value).

As will be noted from the figure, when $h_{MR}/L$ is about 5 or more, preferably about 10 or more, in other words when the tapered portion length L is about ⅕ or less of the MR height $h_{MR}$, preferably about ¹⁄₁₀ or less of $h_{MR}$, the increased ratio of the element resistance can be suppressed at 5 % or less which level becomes almost trivial for the MR head. The $h_{MR}/L$ of about 10 can be realized by determining the ion milling conditions so that the incident angle of the ion beam is about 80 degree or more, preferably 90 degree (perpendicular to the surface of the MR layer) and the thickness of the resist mask is about 1.5 μm or less, preferably about 1.0 μm or less. If the mask thickness is determined to about 3.0 μm as that in the conventional MR head, $h_{MR}/L$ becomes about 3 and therefore the increased ratio of the element resistance exhibits a large value of about 25 %.

By determining $h_{MR}/L$ to about 5 or more, preferably about 10 or more, as described in this embodiment, the increased ratio of the element resistance can be suppressed. Also, the reproduced output power from the MR head can be prevented from being lowered, and precision of estimated life of the MR element can be prevented from deteriorating.

In the aforementioned embodiment, although the ion milling process is used for patterning the MR layer 13, another etching processes such as RIE (Reactive Ion Etching) can be utilized in stead of the ion milling.

Many widely different embodiments of the present invention may be constructed without departing from the spirit and scope of the present invention. It should be understood that the present invention is not limited to the specific embodiments described in the specification, except as defined in the appended claims.

What is claimed is:

1. A magnetoresistive effect element including a magnetoresistive effect layer with a strip shape extending in a track width direction, said layer having a surface located at a front end edge of the layer, to be opposed to a magnetic medium, and a tapered portion located at a rear end edge of the layer, a length of said tapered portion along a direction perpendicular to the track width direction (L) being determined to substantially ⅕ or less of a distance between said front end edge and said rear end edge of the layer ($h_{MR}$).

2. A thin film magnetic head having the element claimed in claim 1.

3. The element as claimed in claim 1, wherein the length of said tapered portion along a direction perpendicular to the track width direction (L) is determined to substantially ⅒ or less of the distance between said front end edge and said rear end edge of the layer ($h_{MR}$).

4. A thin film magnetic head having the element claimed in claim 3.

* * * * *

UNITED STATES PATENT AND TRADEMARK OFFICE
CERTIFICATE OF CORRECTION

PATENT NO. : 5,978,184

DATED : November 2, 1999

INVENTOR(S) : TERUNUMA

It is certified that error appears in the above-identified patent and that said Letters Patent is hereby corrected as shown below:

Title page:
    Item [73], please delete " Kanagawa, Japan " , and insert therefor, -- Tokyo, Japan --

Signed and Sealed this

Twenty-second Day of May, 2001

Attest:

NICHOLAS P. GODICI

Attesting Officer   Acting Director of the United States Patent and Trademark Office